United States Patent
Wayne et al.

(10) Patent No.: US 11,539,650 B2
(45) Date of Patent: Dec. 27, 2022

(54) SYSTEM AND METHOD FOR ALERTS FOR MISSING COVERAGE OF CHATBOT CONVERSATION MESSAGES

(71) Applicant: International Business Machines Corporation, Armonk, NY (US)

(72) Inventors: Eric Donald Wayne, Raleigh, NC (US); Kyle Croutwater, Chapel Hill, NC (US); Michael David Whitley, Durham, NC (US); Vikrant Verma, Raleigh, NC (US); Zhe Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/930,615

(22) Filed: Jul. 16, 2020

(65) Prior Publication Data

US 2022/0021636 A1    Jan. 20, 2022

(51) Int. Cl.
*G06F 15/16* (2006.01)
*H04L 51/224* (2022.01)
*H04L 51/04* (2022.01)
*H04L 51/216* (2022.01)

(52) U.S. Cl.
CPC ............ *H04L 51/224* (2022.05); *H04L 51/04* (2013.01); *H04L 51/216* (2022.05)

(58) Field of Classification Search
CPC .... G06K 9/6219; G06K 9/6218; H04L 51/24; H04L 51/04; H04L 51/16; H04L 51/224; H04L 51/216; H04L 51/02
See application file for complete search history.

(56) References Cited

U.S. PATENT DOCUMENTS

| 9,620,147 | B2 | 4/2017 | Deshmukh | |
|---|---|---|---|---|
| 10,170,106 | B2 | 1/2019 | Gelfenbeyn | |
| 10,554,817 | B1* | 2/2020 | Sullivan | G06N 5/02 |
| 2019/0102078 | A1 | 4/2019 | Bhatt | |
| 2019/0182382 | A1 | 6/2019 | Mazza | |
| 2019/0272547 | A1* | 9/2019 | Coman | G06Q 30/01 |
| 2019/0311036 | A1 | 10/2019 | Shanmugam | |

(Continued)

OTHER PUBLICATIONS

Aasish Pappu et al., "Method and System for Providing Semi-Supervised User Intent Detection for Multi-Domain Dialogues," IP.com, IPCOM000249786D, Apr. 5, 2017, 6 pages.

(Continued)

*Primary Examiner* — John B Walsh
(74) *Attorney, Agent, or Firm* — Terrile, Cannatti & Chambers, LLP; Emmanuel A. Rivera (57) ABSTRACT

A method, system, and computer-usable medium are disclosed for identifying areas to improve an interactive conversational system, such as a chatbot. A stream of stream of conversational interactions C ($C_1, C_2, \ldots, C_n$) between users and the interactive conversational system is received. An intent clustering model is periodically applied to the stream to form an incremental clustering based on a set of derived intents to form a mapping from a first set of conversational characteristics to a first set of intents and a second set of conversational characteristics to a first set of unclear intents. Information is provided related to the second set of conversation characteristics.

20 Claims, 6 Drawing Sheets

(56) References Cited

U.S. PATENT DOCUMENTS

| | | | | |
|---|---|---|---|---|
| 2019/0347668 A1* | 11/2019 | Williams | ............ | H04L 67/2833 |
| 2020/0273326 A1* | 8/2020 | Shotton | .................. | H04W 4/80 |
| 2020/0394455 A1* | 12/2020 | Lee | ...................... | G06K 9/6259 |
| 2021/0073922 A1* | 3/2021 | Wang | ..................... | G06N 5/003 |
| 2021/0081615 A1* | 3/2021 | McRitchie | ............ | G06F 40/253 |
| 2021/0097140 A1* | 4/2021 | Chatterjee | ............. | G06F 16/332 |
| 2021/0142791 A1* | 5/2021 | Penta | .................. | G10L 15/1815 |
| 2021/0303798 A1* | 9/2021 | Duong | ................ | G06F 16/3329 |

OTHER PUBLICATIONS

Hakkani-Tür, Dilek et al., "Clustering novel intents in a conversational interaction system with semantic parsing," Sixteenth Annual Conference of the International Speech Communication Association, 2015.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM AND METHOD FOR ALERTS FOR MISSING COVERAGE OF CHATBOT CONVERSATION MESSAGES

BACKGROUND OF THE INVENTION

Field of the Invention

The present invention relates in general to the field of computers and similar technologies, and in particular to software utilized in this field. Still more particularly, it relates to a method, system, and computer-usable medium for providing alerts of missing coverage of chatbot conversation messages.

Description of the Related Art

With the increased usage of computing networks, such as the Internet, users rely on applications to assist them to perform various tasks. One such software application is a chatbot, also known as conversational agents. A chatbot is implemented to simulate a conversation or chat with a user in a natural language through devices, websites, messaging applications, etc.

Users can have a broad number of questions that a chatbot is asked to answer or reply to. To keep a chatbot effective in answering such broad number of questions, typically involves an examination of logs between users and the chatbot. This can involve an intensive analysis performed by a person, such as a subject matter expert (SME). Such an analysis can include regularly accessing, filtering, and reading interactions from logs between users and the chatbot to identify instances when a user's question was not answered. Considering the amount of traffic and the number of logs that can exist, resources and/or the time available for a SME or a team of SMEs to analyze, may not support keeping a chatbot or chatbots updated.

In certain instances, a SME may have to plan regular intervals to perform analysis and may be unaware of potentially serious quality issues in production and/or support of chatbots. In addition, even after a SME understands what questions are not being answered, the SME must update the chatbot definition to add an intent (response or answer) with training examples, and response logic and text. As more of a SME's time is taken up performing such activities, delays occur in adding coverage to users' questions, resulting in negative user experience. The cost savings of the use of chatbot in place of a real person goes away with poor user service. In addition, there can be several SMEs or a team of SMEs responsible for multiple chatbots. Each SME would need to be knowledgeable as to multiple skills in production and/or support of the chatbots and affecting scalability.

SUMMARY OF THE INVENTION

A method, system, and computer-usable medium are disclosed for identifying areas to improve an interactive conversational system, such as a chatbot. A stream of conversational interactions C ($C_1$, $C_2$, . . . , $C_n$) between users and the interactive conversational system is received. An intent clustering model is periodically applied to the stream to form an incremental clustering based on a set of derived intents to form a mapping from a first set of conversational characteristics to a first set of intents and a second set of conversational characteristics to a first set of unclear intents. Information is provided related to the second set conversation characteristics.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present application relates generally to detecting user messages not covered by a chatbot, providing alerts, and recommending intents (e.g., acceptable response to a user's question/message) with training examples based on message log events. In various embodiments, an active processing component, described herein as a missing intent monitor, continuously monitors, and reads log events as users interact with a chatbot or chatbots. A clustering algorithm leverages the messages in the log events, to form incremental clustering based on a set of derived intents to form a mapping. An intent can be considered as an acceptable response or answer to a user message or question. The missing intent monitor implements a machine learning model to detects case where an intent does not exist for a set of related user utterances. Subject matter experts (SME) can be notified as to context of frequency of questions for missing intent, and improvements if the missing intent is created. A suggestion and the skill that the new intent may belong to can be made for the chatbot. To support machine learning, feedback from SMEs can be provided to improve future detection.

Figure 1:
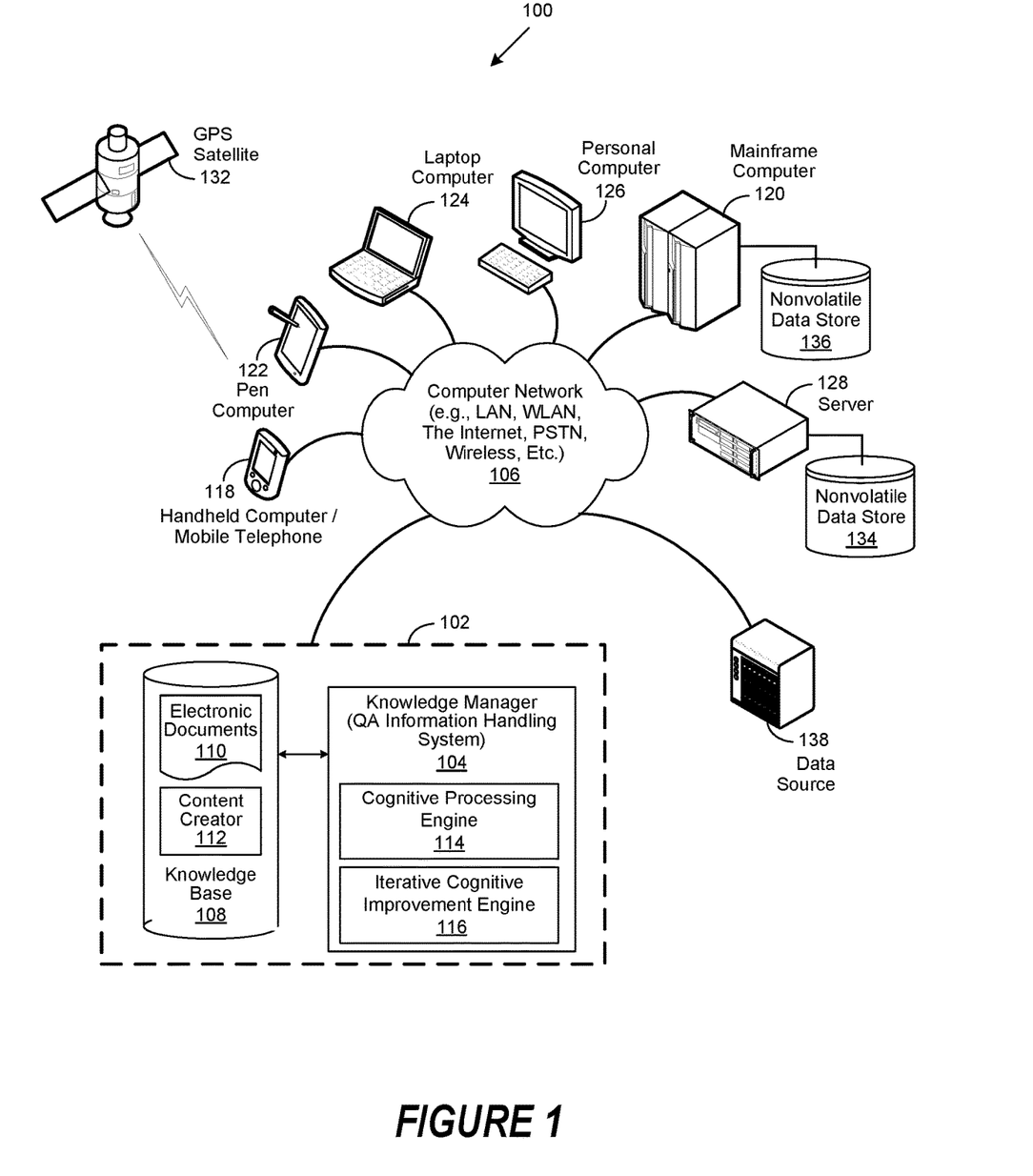
FIG. 1 depicts a computer network environment that includes a knowledge management system.

FIG. 1 depicts a schematic diagram of one illustrative embodiment of a computer network environment that supports the systems and methods described herein. In particular, the computer network environment 100 provides for a knowledge management system 102 which is instantiated in computer network environment 100. An example of question/answer generation which may be used in conjunction with the principles described herein is described in U.S. Patent Application Publication No. 2011/0125734, which is herein incorporated by reference in its entirety.

The knowledge management system 102 may include a knowledge manager (question and answering information handling system) computing device 104 that includes one or more processors and one or more memories, and potentially any other computing device elements generally known in the art including buses, storage devices, communication interfaces, and the like) connected to a network 106. The network 106 may include multiple computing devices in communication with each other and with other devices or components via one or more wired and/or wireless data communication links, where each communication link may comprise one or more of wires, routers, switches, transmitters, receivers, or the like.

The knowledge management system 102 and the computer network environment 100 may enable question and answer (QA) generation functionality for one or more content users. Other embodiments of knowledge management system 102 may be used with components, systems, subsystems, and/or devices other than those that are depicted herein.

Knowledge manager computing device 104 may be configured to receive inputs from various sources. For example, knowledge manager computing device 104 may receive input from the network 106, a knowledge base 108 which can include a corpus of electronic documents 110 or other data, a content creator 112, content users, and other possible sources of input. In various embodiments, the other possible sources of input can include location information. In one embodiment, some, or all of the inputs to knowledge manager computing device 104 may be routed through the network 106. The various computing devices on the network 106 may include access points for content creators and content users. Some of the computing devices may include devices for a database storing the corpus of data. The network 106 may include local network connections and remote connections in various embodiments, such that the knowledge management system 102 may operate in environments of any size, including local and global, e.g., the Internet. Additionally, knowledge manager computing device 104 serves as a front-end system that can make available a variety of knowledge extracted from or represented in documents, network-accessible sources, and/or structured data sources. In this manner, some processes populate the knowledge manager with the knowledge manager also including input interfaces to receive knowledge requests and respond accordingly.

In one embodiment, the content creator 112 creates content in electronic documents 110 for use as part of a corpus of data with knowledge manager computing device 104. The electronic documents 108 may include any file, text, article, or source of data for use in knowledge management system 102. Content users may access knowledge management system 102 via a network connection or an Internet connection (represented as to the network 106) and may input questions to knowledge management system 102 that may be answered by the content in the corpus of data. As further described below, when a process can implement a query with exclusion criteria from the knowledge manager. Certain embodiments provide for Natural Language Processing (NLP), such that knowledge management system 102 can be considered as an NLP system, which in certain implementations performs the methods described herein. In one embodiment, the process sends queries in the form of natural language questions, etc.) to the knowledge manager computing device 104. Knowledge manager computing device 104 may interpret questions/queries and provide a response to the content user containing one or more answers/results to the questions/queries. In some embodiments, knowledge manager computing device 104 may provide a response to users in a ranked list of answers. Certain embodiments provide for knowledge manager computing device 104 to include a cognitive processing engine 114 and iterative cognitive improvement engine 116, which are further described herein. In certain embodiments, the knowledge management system 102 is provided as a cloud computing service.

One such knowledge management system 102 is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge manager computing device 104 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize computer network environment 100 range from small handheld devices, such as handheld computer/mobile telephone 118 to large mainframe systems, such as mainframe computer 120. Examples of handheld computer 118 include personal digital assistants (PDAs), personal entertainment devices, such as MP3 players, portable televisions, and compact disc players. Other examples of information handling systems include pen, or tablet, computer 122, laptop, or notebook, computer 124, personal computer system 126, and server 128. In certain embodiments, the location information is determined through the use of a Geographical Positioning System (GPS) satellite 132. In these embodiments, a handheld computer or mobile telephone 116, or other device, uses signals transmitted by the GPS satellite 132 to generate location information, which in turn is provided via the network 106 to the knowledge manager system 102 for processing. As shown, the various information handling systems can be networked together using network 106. Types of network 106 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 128 utilizes nonvolatile data store 134, and mainframe computer 118 utilizes nonvolatile data store 136). The nonvolatile data store 134 can be a component that is external to the various information handling systems or can be internal to one of the information handling systems. Furthermore, a data store 138 is provided in computer network environment 100.

Figure 2:
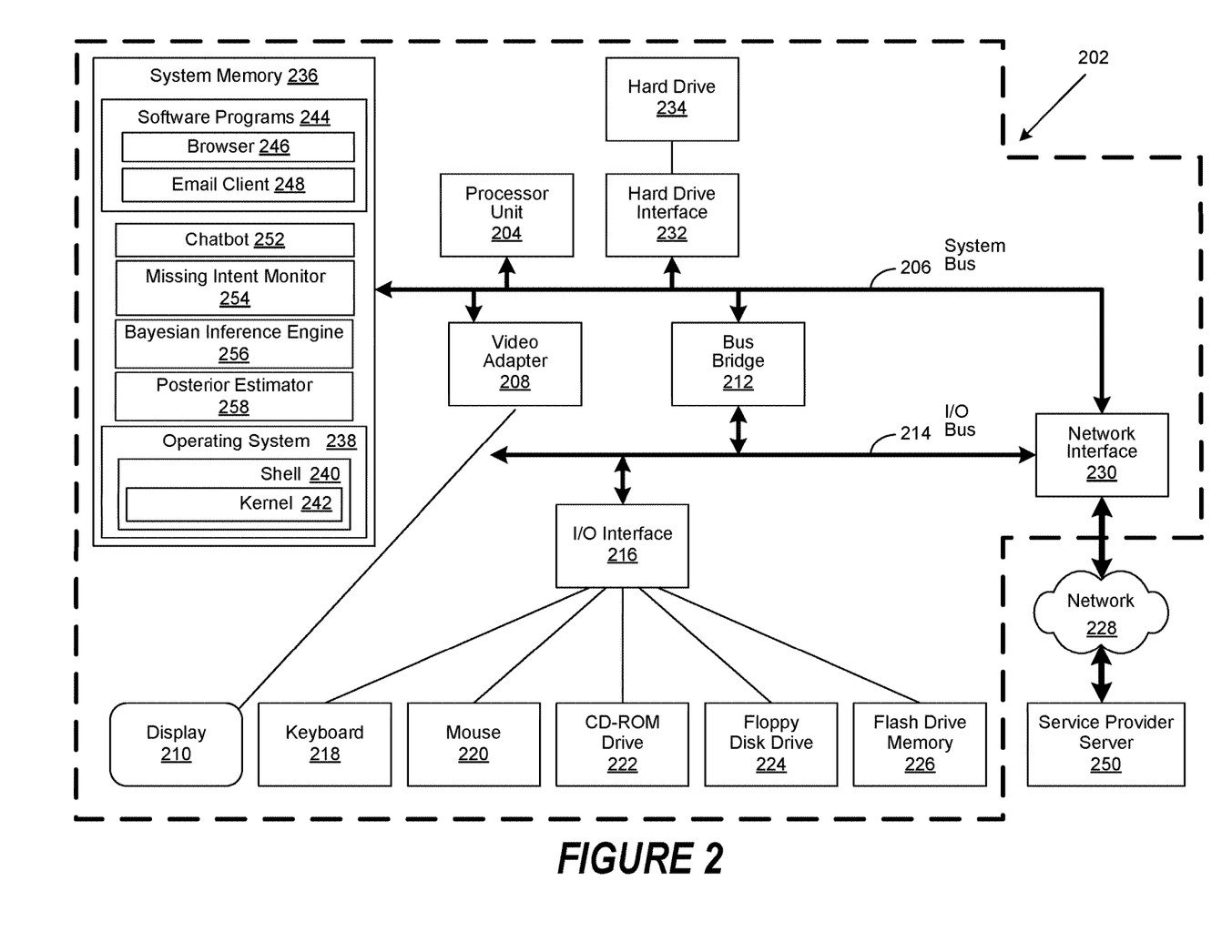
FIG. 2 is a simplified block diagram of an information handling system capable of performing computing operations described herein.

An illustrative example of an information handling system showing an exemplary processor and various components commonly accessed by the processor is shown in FIG. 2. FIG. 2 illustrates an information processing handling system 202, more particularly, a processor and common components, which is a simplified example of a computer system capable of performing the computing operations described herein. It is to be understood that the information handling system 202 can be implemented as or part of knowledge management system 102 as described in FIG. 1. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 250 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 250. In certain implementations, the network 228 is network 106 as described in FIG. 1.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250. In various embodiments, software programs 244 includes a recommendation module 252 and an information gathering module 254, which are further described herein.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Universal Serial Bus (USB) drives, Secure Digital (SD) cards, Solid State Drive (SSD), and the like. These and other variations are intended to be within the spirit, scope, and intent of the present invention. Furthermore, it is to be understood that in certain implementations, the described aspects of information processing information handling system 202 can be performed through decentralized cloud computing.

Figure 3:
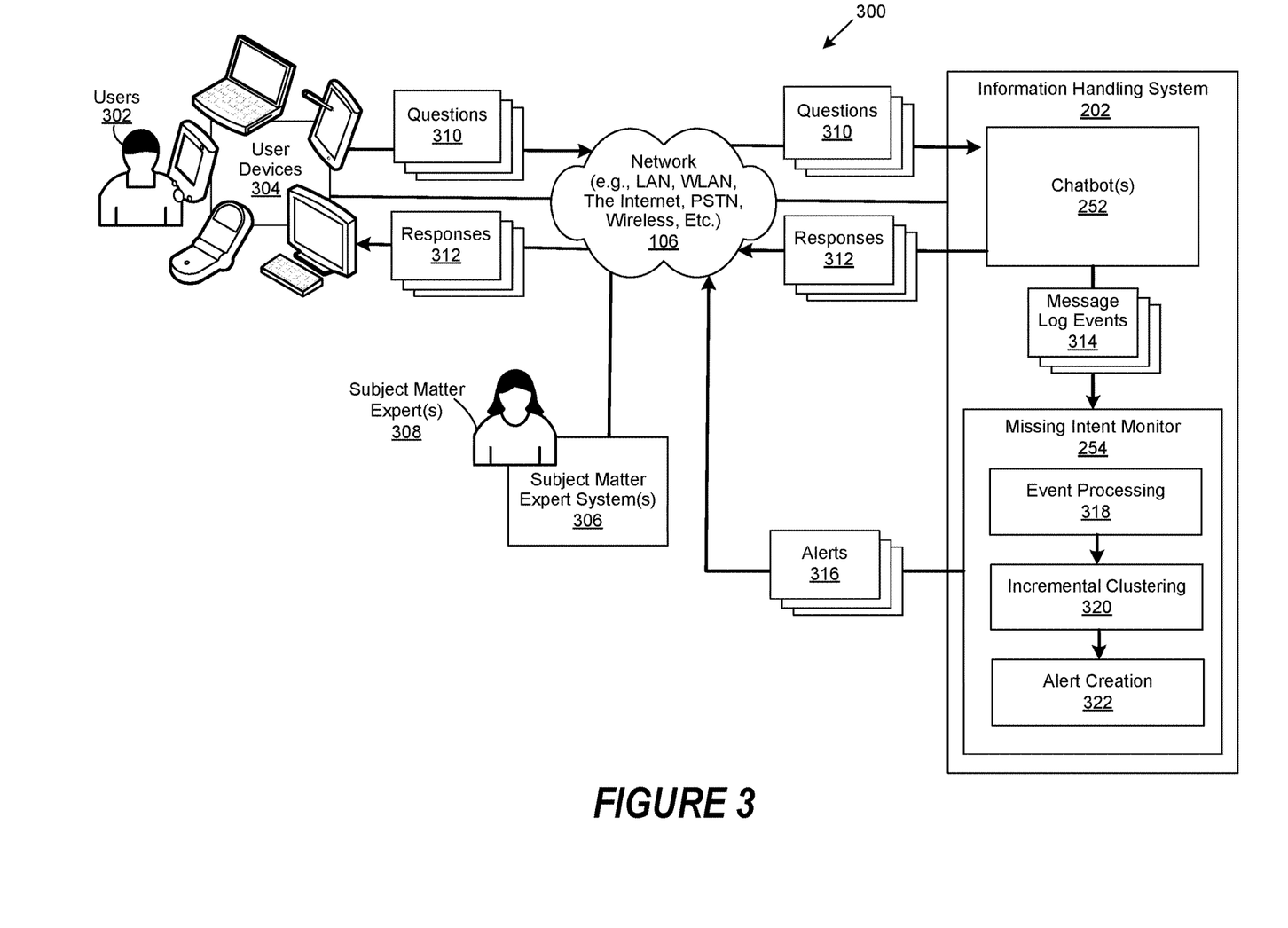
FIG. 3 is a simplified block diagram of a system capable of implementing the described operations and methods.

FIG. 3 shows a system capable of implementing the described operations and methods. The system 300 includes the network 106 described above, which connects multiple users 302 through user devices 304 to information handling system 202. A user device 304 can refer to an information handling system such as a personal computer, a laptop computer, a tablet computer, a personal digital assistant (PDA), a smart phone, a mobile telephone, or other device that is capable of communicating and processing data. In certain embodiments, the information handling system 202 is implemented or performed through decentralized cloud computing.

The system 300 includes one or more subject matter expert (SME) systems 306, which allow one or more (i.e., team of) of subject matter experts (SME) 308 to connect with the information handling system 202. In particular, SME systems 306 connect to the information handling system 202 through network 106.

In various implementations, users 302 through user devices 304 communicate or interact with the information handling system 202, and particularly communicate or interact with one or more chatbot(s) 252. Chatbot(s) 252 can be considered as interactive conversational systems. Messages, such as questions 310 are sent from user devices 304, to chatbot (s) 252. The chatbot(s) 252 returns messages or responses 312 in response to messages or questions 310.

The chatbot(s) 252 creates and actively provides (i.e., emits) message log events 314 which are based on the messages or questions 310 and messages or responses 312 to the missing intent monitor 254. The message log events 314 are representative of the conversational interactions of users 302 and chatbot(s) 252. In certain implementations, the message log events 314 are streamed in real-time to missing intent monitor 254.

New or incoming messages or message log events 314 can be actively monitored by the missing intent monitor 254. In certain implementations, a consumer application, such as a Kafka consumer, included in the missing intent monitor 254, reads or monitors new or incoming message log events 314. Furthermore, as described herein, the same consumer application can trigger missing intent detection or alerts to SME(s) 308.

The missing intent monitor 254 is considered as an active processing component. In certain implementations, the missing intent monitor 254 uses machine learning by detecting instances (i.e., log events) where an intent does not exist for a set of related user messages or questions 310 (i.e., utterances) and receiving feedback from the SME(s) 308 to improve future detection techniques.

As further described herein, the missing intent monitor 254 provides notices or alerts 316 to SME(s) 308 through SME system(s) 306. Such notices or alerts 316 can include context about the frequency of questions for the missing intent, and potential improvement if the missing intent is created. For implementations with multiple chatbots 252, notices or alerts 316 can include suggestions as to which chatbot 252 and/or or skill (e.g., answering capability) a new intent belongs to, which can assist SME(s) 308 in making such associations.

In various embodiments, the missing intent monitor 254 includes event processing 318, incremental clustering 320 and alert creation 322. The event processing 318 processes the streamed message log events 314. Active incremental processing 320 is performed on the processed streamed message log events 314. Incremental clustering 320 is implemented as opposed to full clustering due to active streaming. For various implementations. the incremental clustering 320 uses a clustering algorithm as further described herein. Such a clustering algorithm can be improved based on feedback from the SME(s) 308, providing machine learning for the missing intent monitor 252 and particularly for incremental clustering 320.

Alert creation 322 is provided from input from incremental clustering 320. Alert creation 322 can include providing alerts 316 to the SME(s) 308 with contextual alerts that include recommending an intent with training examples which can help SME(s) 308 to resolve the alerts. In certain implementations, the alerts 316 can include suggestions as to which skill(s) to add to which chatbots 252 when there are more than one chatbots 252.

Clustering forms groups of conversational interactions that represent candidate intents. Incremental clustering is a performance optimization that constantly maintains a set of candidate intents. Changes are made to the set of candidate intents that are relevant to the latest set of incoming conversational interactions or utterances. An example of incremental clustering is as follows: given a new conversation interaction or utterance, compute the semantic similarity between the utterance and the centroids of existing clusters, add the utterance to the first cluster that matches the condition (e.g., similarity is higher than a preset threshold). If the utterance does not match an existing cluster, create a new cluster, and set the utterance as the centroid of the new cluster.

Figure 4:
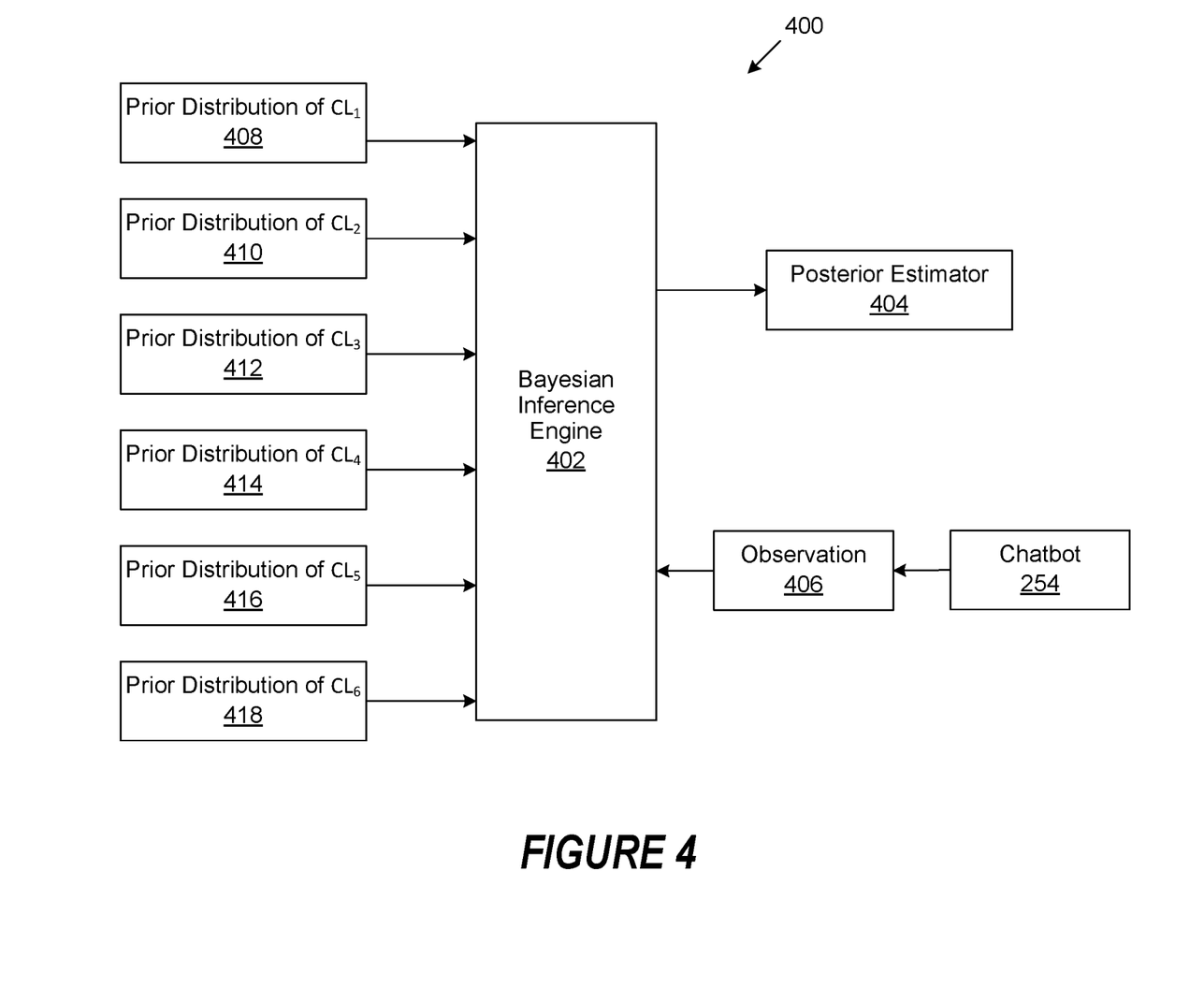
FIG. 4 is a block diagram representation of a clustering algorithm.

FIG. 4 shows a block diagram representation of a clustering algorithm. New incoming messages (i.e., streamed message log events 314) are periodically processed through an intent clustering algorithm that uses as a starting model existing skills intent or examples.

There can be current/existing discrete clusters. For example, $CL_1$ relates to "classification confidence," $CL_2$ relates to "similarity to existing intents," $CL_3$ relates to "number of occurrences," and $CL_4$, $CL_5$, and $CL_6$ are linguistics attributes, where $CL_4$ relates to "number of characters," $CL_5$ relates to "number of tokens" and $CL_6$ relates to "lexical diversity."

In certain implementations, the clustering algorithm 400 provides for automatically adding new utterances in consideration for improvement. In particular, the clustering algorithm 400 is directed at reducing annotation effort. In certain implementations, the clustering algorithm 400 is trained based on previous selection from SME(s) 308. For example, when an utterance is detected such as "How can I open an account?," an alert is triggered asking the SME(s) 308 whether to add or ignore the utterance. If the SME(s) 308 decides to add the utterance, in certain implementations a Bayesian inference engine 402 and posterior estimator 404 are invoked. The Bayesian inference engine 402 extracts a set of features from the utterance. For example, $CL_1$ (classification confidence)=0.4, $CL_5$ (number of tokens)=6.0. Then the Bayesian inference engine 402 updates a prior distribution of each feature, for example, distribution $CL_1 -> 0.4$ (ADD+1, IGNORE). With additional observations from SME(s) 308, the clustering algorithm 400 learns to ADD or IGNORE utterances. For example, if there is detection of another utterance "How to open an account?," such an utterance is similar to the previous utterance. Based on feature prior distributions, the Bayesian inference engine 402 can decide to ADD the utterance without direction from SME(s) 408.

Therefore, implementations provide for applying periodically an intent clustering model to the stream of messages, to form an incremental clustering based on a set of derived intents to form a mapping from a first set conversational characteristics to a first set of intents and a second set of conversational characteristics to a first set of unclear intents; and providing information related to the second set of conversation characteristics.

Referring to FIG. 3, in certain implementations, the Alerts 316 to SME(s) 308 can include notification as to the results of algorithm 400 and potential improvement. In particular, a temporary skill can be populated in chatbot(s) 252 with new candidate intents and corresponding examples, allowing for system training or machine learning. In certain implementations, new temporary skills can be compared to existing production performance of historically saved messages (e.g., 30/90 day retention). New intents can be identified that provide coverage of new messages that were missing or were confused previously. Notifications can provide for a prompt of new intents with examples that can be added to the information handling system 202 and particularly to chatbot(s) 252. Certain implementations can provide for a before and after chart to SME(s) 308 that show existing performance of chatbot(s) 252 versus performance with recommendations to the chatbot(s) 252. SME(s) 252 actions taken on recommended intents can be re-entered missing intent monitor 254 provide better missing intent detection.

Figure 5:
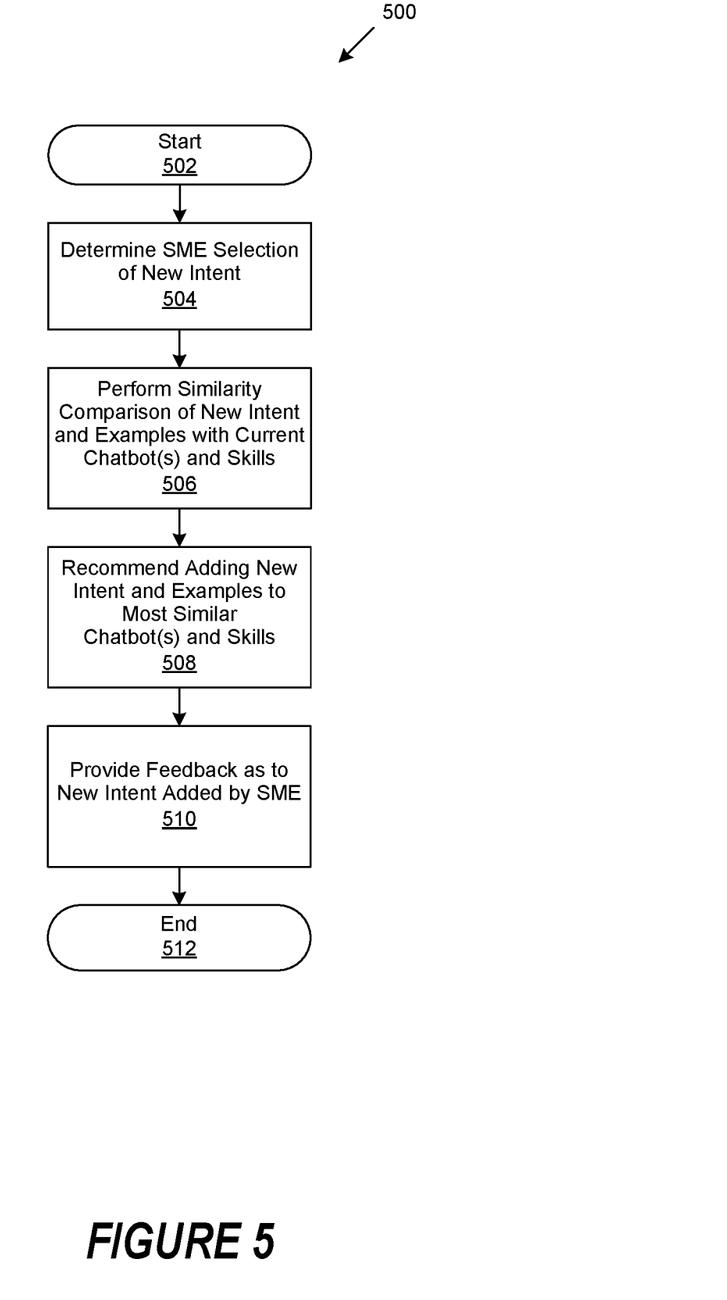
FIG. 5 is a generalized flowchart for skill set selection for chatbot(s)

FIG. 5 is a generalized flowchart 500 for skill set selection for chatbot(s). The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 600 starts. At step 504, a determination is performed as to selection of new intent(s) made a SME(s) 308. At step 506, a similarity comparison is performed based on the new intents and examples with current chatbot(s) 252 and skill(s) which the SME(s) 308 has access to. At step 508, a recommendation is made as to adding the new intent(s) and examples to the most similar chatbot(s) 252 or skills. At step 510, any user action taken on which chatbot/skill to add the new intent to is used as feedback into the similarity comparison from step 506 for future recommendations. At step 512, the process 500 ends.

Figure 6:
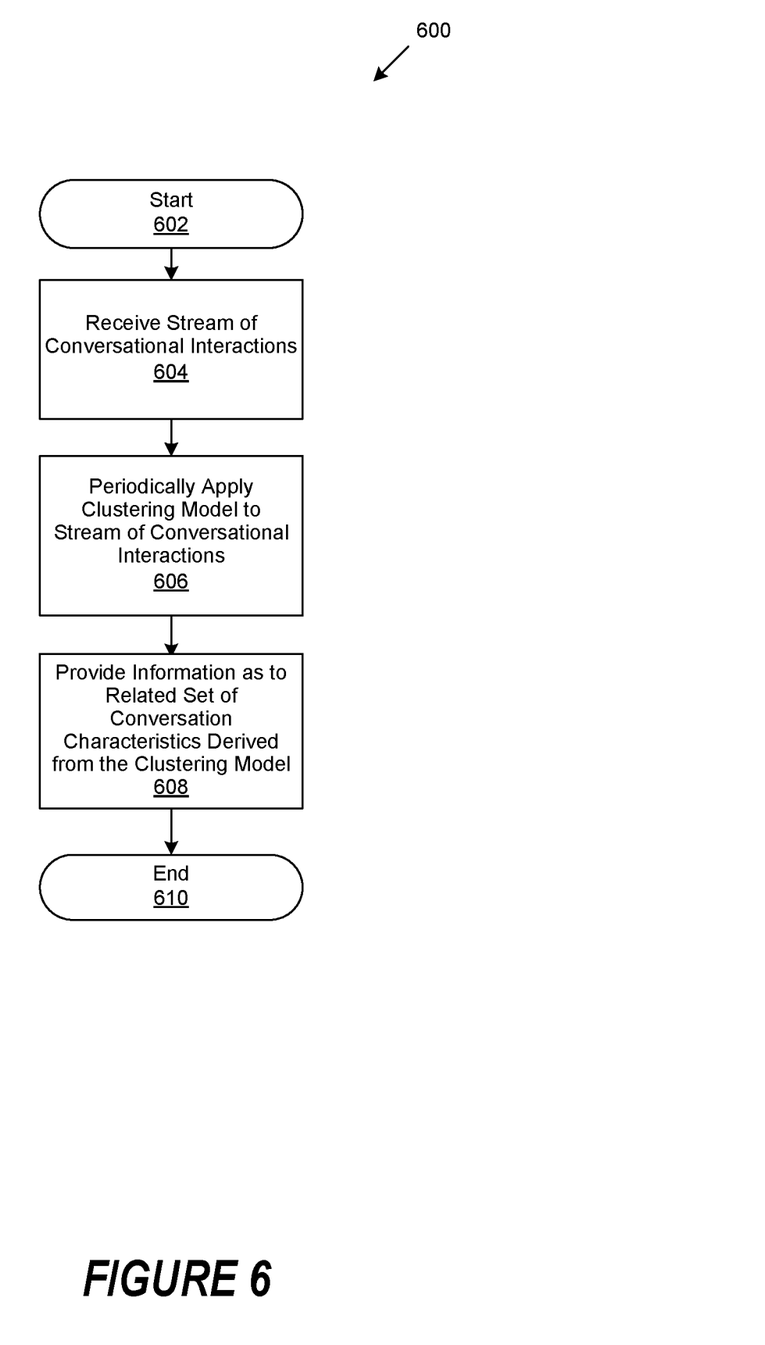
FIG. 6 is a generalized flow chart for identifying areas to improve an interactive conversational system.

FIG. 6 is a generalized flowchart 600 for identifying areas to improve an interactive conversational system. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, receiving a stream of conversational interactions C ($C_1, C_2, \ldots, C_n$) between users and an interactive conversational system is performed.

At step 606, an intent clustering model is periodically applied to the stream of conversational interactions C ($C_1, C_2, \ldots, C_n$) to form an incremental clustering. The incremental clustering can be based on a set of derived intents to form a mapping from a first set conversational characteristics to a first set of intents and a second set of conversational characteristics to a first set of unclear or problematic intents.

At step 608, providing information as to the information related to the second set of conversation characteristics is performed. At step 610, the process 600 ends.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for identifying areas to improve an interactive conversational system comprising:
    receiving a stream of conversational interactions C ($C_1$, $C_2$, ..., $C_n$) between users and the interactive conversational system;
    monitoring instances of the conversational interactions C ($C_1$, $C_2$, ..., $C_n$) for intents that do not exist for a set of related messages or questions;
    applying periodically an intent clustering model to the stream to form an incremental clustering based on a set of derived intents to form a mapping from a first set of conversational characteristics to a first set of intents and a second set of conversational characteristics to a first set of unclear intents that include the intents that do not exist, wherein changes are made to a set of candidate intents relevant to a set of incoming utterances;
    computing semantic similarity between the utterances and centroids of exiting clusters;
    adding an utterance to a first cluster that matches a condition;
    creating a new cluster if there is no cluster matching the condition, wherein the utterance is the centroid of the new cluster, wherein an intent clustering algorithm is applied to the set of incoming utterances and trained based on previous selections of subject matter experts; and
    providing information related to the second set of conversation characteristics.

2. The method of claim 1, wherein the information includes a frequency and a context for a selected a set of conversations taken from the stream of conversational interactions C ($C_1$, $C_2$, ..., $C_n$).

3. The method of claim 2, wherein the information further comprises identifying a missing intent and providing a suggestion for adding the missing intent into the system.

4. The method of claim 3 further comprising receiving updates for the missing intent and adding the received updates into the interactive conversational system.

5. The method of claim 1, wherein multiple interactive conversational system are supported.

6. The method of claim 1, wherein the receiving the stream is in real-time.

7. The method of claim 1, wherein the providing the information further includes providing recommendations as to skills that can be applied to the interactive conversational system.

8. A system comprising:
    a processor;
    a data bus coupled to the processor; and
    a computer-usable medium embodying computer program code, the computer-usable medium being coupled to the data bus, the computer program code used for identifying areas to improve an interactive conversational system executable by the processor and configured for:

receiving a stream of conversational interactions C ($C_1$, $C_2$, ..., $C_n$) between users and the interactive conversational system;

monitoring instances of the conversational interactions C ($C_1$, $C_2$, ..., $C_n$) for intents that do not exist for a set of related messages or questions;

applying periodically an intent clustering model to the stream to form an incremental clustering based on a set of derived intents to form a mapping from a first set of conversational characteristics to a first set of intents and a second set of conversational characteristics to a first set of unclear intents that include the intents that do not exist, wherein changes are made to a set of candidate intents relevant to a set of incoming utterances, compute semantic similarity between the utterances;

computing semantic similarity between the utterances and centroids of exiting clusters;

adding an utterance to a first cluster that matches a condition;

creating a new cluster if there is no cluster matching the condition, wherein the utterance is the centroid of the new cluster, wherein an intent clustering algorithm is applied to the set of incoming utterances and trained based on previous selections of subject matter experts; and providing information related to the second set of conversation characteristics.

9. The system of claim 8, wherein the information includes a frequency and a context for a selected a set of conversations taken from the stream of conversational interactions C ($C_1$, $C_2$, ..., $C_n$).

10. The system of claim 9, wherein the information further comprises identifying a missing intent and providing a suggestion for adding the missing intent into the system.

11. The system of claim 10 further comprising receiving updates for the missing intent and adding the received updates into the interactive conversational system.

12. The system of claim 8, wherein multiple interactive conversational system are supported.

13. The system of claim 8, wherein the wherein the receiving the stream is in real-time.

14. A non-transitory, computer-readable storage medium embodying computer program code, the computer program code comprising computer executable instructions configured for:

receiving a stream of conversational interactions C ($C_1$, $C_2$, ..., $C_n$) between users and the interactive conversational system;

monitoring instances of the conversational interactions C ($C_1$, $C_2$, ..., $C_n$) for intents that do not exist for a set of related messages or questions;

applying periodically an intent clustering model to the stream to form an incremental clustering based on a set of derived intents to form a mapping from a first set of conversational characteristics to a first set of intents and a second set of conversational characteristics to a first set of unclear intents that include the intents that do not exist, wherein changes are made to a set of candidate intents relevant to a set of incoming utterances;

computing semantic similarity between the utterances and centroids of exiting clusters;

adding an utterance to a first cluster that matches a condition;

creating a new cluster if there is no cluster matching the condition, wherein the utterance is the centroid of the new cluster, wherein an intent clustering algorithm is applied to the set of incoming utterances and trained based on previous selections of subject matter experts; and providing information related to the second set of conversation characteristics.

15. The non-transitory, computer-readable storage medium of claim 14, wherein the information includes a frequency and a context for a selected a set of conversations taken from the stream of conversational interactions C ($C_1$, $C_2$, ..., $C_n$).

16. The non-transitory, computer-readable storage medium of claim 15 further comprising receiving updates for the missing intent and adding the received updates into the interactive conversational system.

17. The non-transitory, computer-readable storage medium of claim 14, wherein the clustering algorithm generates a dendrogram, and identifies a threshold to split the dendrogram into clusters.

18. The non-transitory, computer-readable storage medium of claim 14, wherein multiple interactive conversational systems are supported.

19. The non-transitory, computer-readable storage medium of claim 14, wherein the receiving the stream is in real-time.

20. The non-transitory, computer-readable storage medium of claim 14, wherein the providing the information further includes providing recommendations as to skills that can be applied to the interactive conversational system.

\* \* \* \* \*